(12) United States Patent
Engler et al.

(10) Patent No.: US 6,810,747 B2
(45) Date of Patent: Nov. 2, 2004

(54) TEST DEVICE FOR DETERMINING THE FRICTION AND PRESTRESS VALUES OF SCREWED CONNECTIONS

(75) Inventors: Paul Engler, Frauenfeld (CH); Rudolf Hans Haab, Winterthur (CH)

(73) Assignee: Kistler Holding AG, Winterthur (CH)

( * ) Notice: Subject to any disclaimer, the term of this patent is extended or adjusted under 35 U.S.C. 154(b) by 51 days.

(21) Appl. No.: 10/203,100

(22) PCT Filed: Feb. 6, 2001

(86) PCT No.: PCT/CH01/00081

§ 371 (c)(1),
(2), (4) Date: Sep. 18, 2002

(87) PCT Pub. No.: WO01/59417

PCT Pub. Date: Aug. 16, 2001

(65) Prior Publication Data

US 2003/0145657 A1 Aug. 7, 2003

(30) Foreign Application Priority Data

Feb. 7, 2000 (CH) ............................................. 0242/00

(51) Int. Cl.$^7$ .................................................. F16B 31/62
(52) U.S. Cl. ....................................................... 73/761
(58) Field of Search .......................................... 73/761

(56) References Cited

U.S. PATENT DOCUMENTS

| | | | | |
|---|---|---|---|---|
| 4,823,606 A | * | 4/1989 | Malicki ........................ 73/761 |
| 5,571,971 A | * | 11/1996 | Chastel et al. ................ 73/761 |
| 5,721,380 A | * | 2/1998 | Gozlan ......................... 73/761 |
| 5,821,432 A | * | 10/1998 | Sidler et al. ........... 73/862.043 |

* cited by examiner

*Primary Examiner*—Max H. Noori
(74) *Attorney, Agent, or Firm*—Barnes & Thornburg

(57) ABSTRACT

A testing for screw connections, comprising a sensor carrier plate with sensors on both sides and being mounted on a base plate, whereby the sensors are sandwiched between a torque introduction plate and a torque sustaining plate, the sensors detecting separately both head and thread friction forces and a preload force.

8 Claims, 3 Drawing Sheets

TEST DEVICE FOR DETERMINING THE FRICTION AND PRESTRESS VALUES OF SCREWED CONNECTIONS

BACKGROUND AND SUMMARY OF THE INVENTION

In the automation of screwing operations, especially in automobile and aircraft engineering, the highest quality standards have to be maintained and documented. For this the screwing tools employed are provided with inbuilt torque registering devices guaranteeing exact maintenance of the preadjusted maximum torques or angles of rotation.

For quality assurance the screwing tools powered pneumatically or electrically are tested at regular intervals on special test benches, after which each tool is given a test certificate.

With the testing equipment in general use the maximum cutout torques of the screwing tools are tested mainly, and readjusted if necessary. These testing devices function mostly on the basis of strain gauges or piezoelectrics, and are kept in special works proof test stations. They are based on values arrived at in the test laboratories through complicated measurements and calculations to define the relationship between the maximum tightening torque $M_{tot}$ and the screw preload force $F_Z$. To ensure an optimal non-positive connection these values must be determined for every screw connection.

The main purpose of the invention is to determine speedily and exactly the principal measured data of a new screw connection using a device according to the invention. For this it must be possible to measure separately the friction values of the screw head $F_{RK}$ on its contact surface and of the screw or nut in the thread $F_{RG}$. This enables material pair values and lubricants to be optimized, so that repeatable screw preload forces $F_Z$ are obtained, while the unscrewing torques of screw locking deices can be determined and optimized. Important also is the ability to determine quickly and reliably three measured values preload $F_Z$ head friction $F_{RK}$ thread friction $F_{RG}$ with different material pairs and surface states at different temperatures.

The invention makes possible a testing device consisting of a central measuring carrier part and interchangeable thread adapters and contact plates which can be screwed together in simple fashion.

Other objects, advantages and novel features of the present invention will become apparent from the following detail description of the invention when considered in conjunction with the accompanying drawings.

DETAILED DESCRIPTION OF THE PREFERRED EMBODIMENTS

Figure 1:
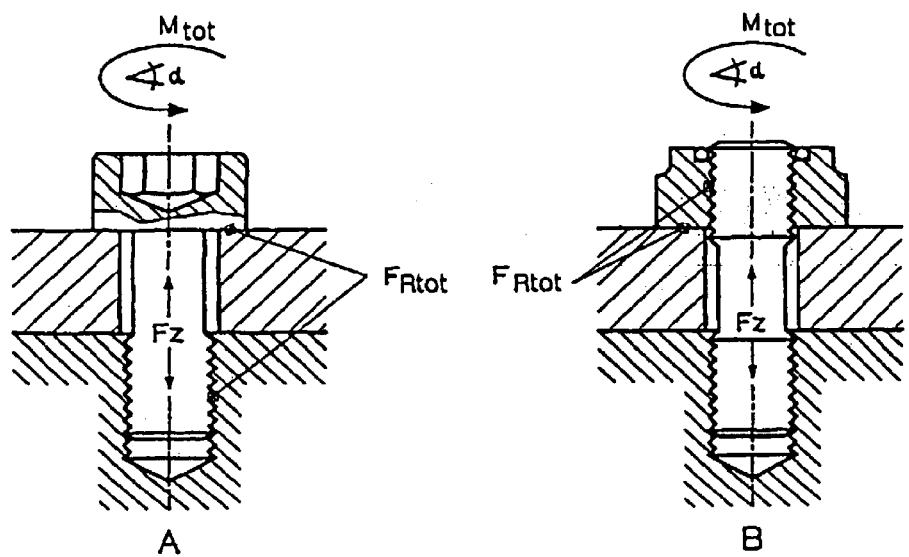
FIGS. 1A & B A and B show the two different types of screw connections.

The prior art is shown in FIGS. 1A. 1B and 2

FIG. 1A shows a screw connection on which only the total friction force $F_{Rtot}$ has been measured, according to the state of the art.

FIG. 1B shows another screw connection oil which likewise only the total friction force $F_{Rtot}$ has been measured according to the state of the art.

Figure 2:
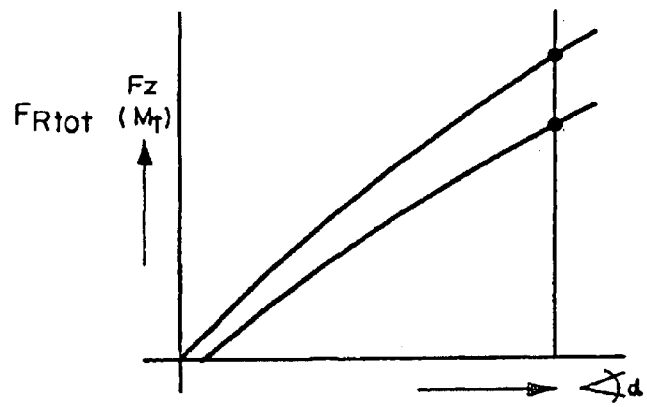
FIG. 2 A usual force/torque diagram based on the angle of rotation α.

FIG. 2 is a graph showing how two values, preload force $F_Z$ and total friction force $F_{Rtot}$, ($M_{TOT}$) are measured with the present testing equipment according to the state of the art.

Figure 3:
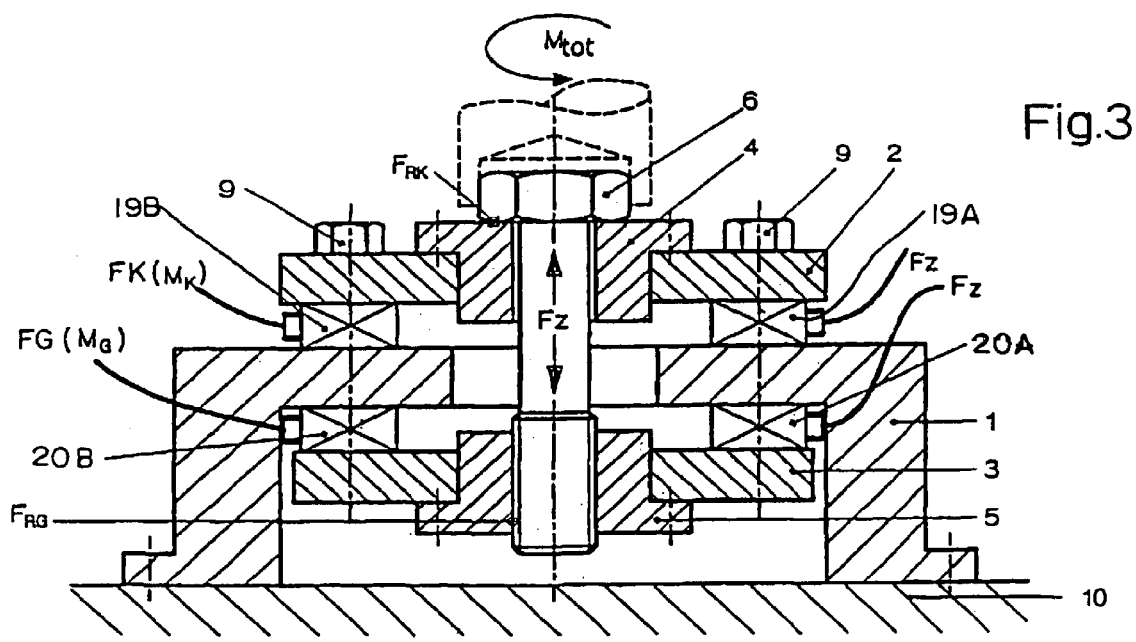
FIG. 3 Functional diagram of the testing device according to the invention.

Referring to FIG. 3. testing deice 40, according to the present invention, enables for the first time exact separation of the total friction force $F_{Rtot}$ into $F_{RK}$ friction force of screw/nut head and $F_{RG}$ friction force of thread.

This allows for the first time entirely new insights into the analysis of screw connections.

Again, referring to FIG. 3, mounted on both sides of a carrier plate 1 are sensor arrangements 19, 20 so that they are constrained by screws 9 between torque introduction plate 2 and torque sustaining plate 3. Sensor arrangements 19, 20 may be all shear force sensors or all axial force sensors or any combination thereof.

Each sensor arrangement 19, 20 includes a minimum of three sensors for a total of at least six sensors, which enables the necessary measurement of force components to calculate desired torques for designing and optimizing screw connections. Each individual sensor in sensor arrangements 19, 20 can be a single component (e.g. measuring $F_Z$), two-component (e.g. measuring $F_Z$ and a shear force) or three-component sensor (e.g. measuring $F_Z$ and more than one shear force). FIG. 3 shows a total of four sensors (19A, 19B, 20A and 20B). in sensor arrangement 19, 20 out of the at least six sensors.

Figure 4:
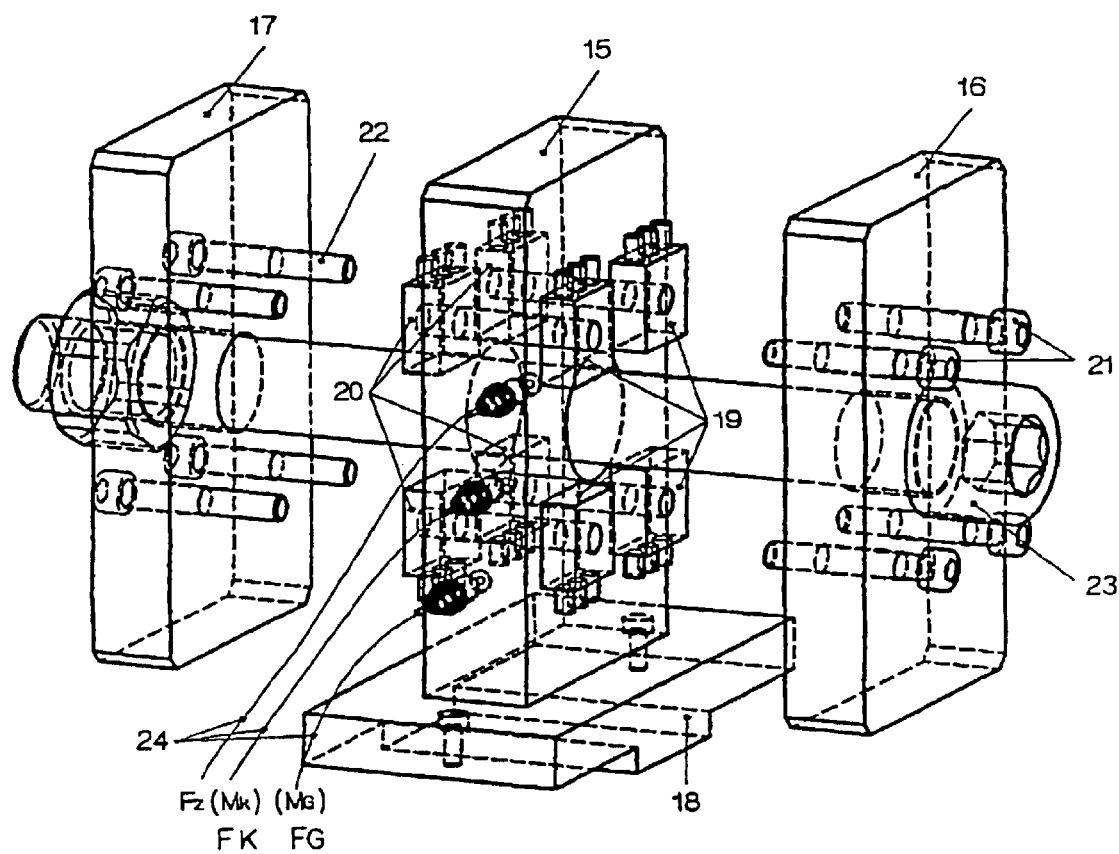
FIG. 4 Possible embodiment of the testing device according to the invention shown drawn apart.

As show in FIG. 4, the sensor arrangements 19, 20 are mounted on each side of the carrier plate 1 so that a generally symmetrical force distribution results. While the mounting of the sensor arrangements shown are arranged generally in a rectangle such a mounting may include, for instance, an arrangement in one or more of a triangle, square, rectangle and circle. Tile sensor arrangements 19, 20 are configured so that individual shear ($F_K$, $F_G$) and axial ($F_Z$) force components can be measured and combined for calculating the desired moment or torque values as referenced herein.

As shown in FIG. 3. a test screw 6 can be inserted through adapter 4 and screwed into adapter 5. The adapters 4, 5 allow for screws of different dimensions to be measured with the same device for tightening and loosening torques and also forces. Upon tightening test screw 6. the preload force $F_Z$ can be measured by axial force sensors 19A, 20A. the head friction or shear force $F_K$ by the shear sensor 19B, and the thread friction or shear force $F_G$ by the shear sensor 20B. Shear force sensors 19B, 20B may be constructed such that they yield a calculated signal value of moments $M_K$, $M_G$ respectively. Alternatively, the shear force signal values $F_K$, $F_G$ from the sensors can be used to calculate moments $M_K$, $M_G$ respectively. Total torque $M_{tot}$ is the sum of $M_K+M_G$. If desired, α rotation angle a (as shown in FIGS. 1A and 1B) sensor may be fitted in also. This is mostly unnecessary on account of the uncertainty of the beginning of the rotation angle measurement.

Four standard values preload force $F_Z$ total torque $M_{tot}$
head friction torque $M_K$
thread friction torque $M_G$
which can be determined exactly with a single tightening operation in the testing device 40 according to the invention, are sufficient for an optimal screw connection design.

It is noted that should there be, during a tightening operation, any twisting motion or torque of screw 6 about an axis other than the axis of force $F_Z$, e.g. along an x- or y-axis (not shown). then $M_{tot}$ may not equal $M_K+M_G$. But, this difference is very small, if it exists at all. The present sensor arrangement can measure the forces and calculate these moments, as is well known.

The sensor arrangements 19, 20 employed in the testing device 40 may be based on piezoelectrics or strain gauges. Piezoelectric sensors have the advantage that they can be used in a much wider temperature range than strain gauge sensors.

FIG. 4 shows another embodiment, testing device 50. The sensor carrier plate 15 is mounted oil the base plate 18. The sensors 19, 20 for measuring shear and axial force and for possibly calculating torque or moments are all arranged on two sides of the carrier plate 15. in which amplifiers (not shown) may be fitted also, which is advantageous especially with piezoelectric sensors. The amplifiers enable measuring signals to be transmitted to evaluation electronics (not shown) with low resistance, though this variant narrows the temperature range considerably. The plates 16 and 17 may be changed in simple manner and matched to particular requirements. Plates 16, 17 are joined to the sensor carrier plate 15 by screw connections 21 and 22. The test screw 23 form a measuring unit together with the plates 16 and 17.

Figure 5:
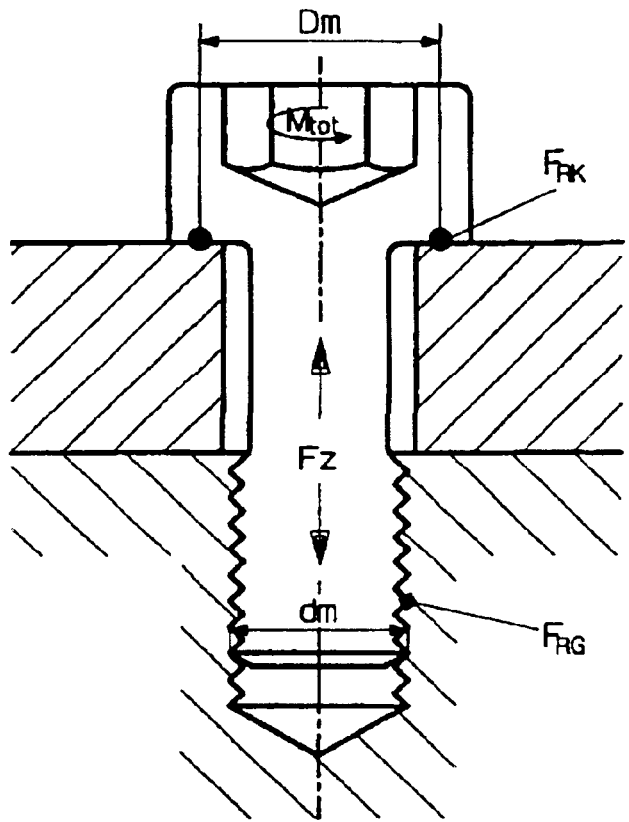
FIG. 5 Typical screw connection to be measured.

FIG. 5 shows a test screw 30, with dimensions from which principal friction values are derived:

head friction value $$\mu_K = \frac{M_K}{F_Z \times Dm}$$

thread friction value $$\mu_G = \frac{M_G}{F_Z \times dm}$$

Figure 6:
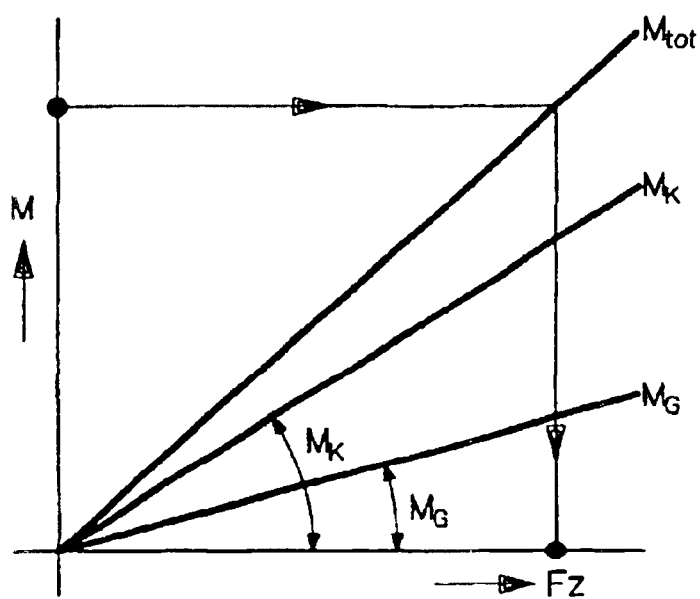
FIG. 6 Measured values determinable with the testing device according to the invention.

FIG. 6 shows a graph plotted from three measured or calculated values $M_K$, $M_G$ and $F_Z$. Total torque $M_{tot}=M_K+M_G$. In the graph, the torques are also shown as a function of $F_Z$.

Further, it should be noted that the amplifiers can be located in the carrier plate and the amplifiers can have a range switchover enabling especially interesting parts of measurements to be magnified by factors.

The testing device according to the invention presents in a simple construction new ways for the optimal design of screw connections.

Although the invention has been described and illustrated in detail, it is to be clearly understood that this is done by way of illustration and example only and is not to he taken by way of limitation. The spirit and scope of the present invention are to be limited only by the terms of the appended claims.

We claim:

1. A testing device for screw connections, comprising a sensor carrier plate with sensors on both sides and being mounted on a base plate, whereby the sensors and sensor carrier are sandwiched between a torque introduction plate and a torque sustaining plate, the sensors detecting separately both head and thread friction forces and a preload force.

2. The testing device for screw connections according to claim 1, wherein the plates are joined with adapters allowing screws of different dimensions to be measured with the same device for tightening and loosening torques and also forces.

3. The testing device for screw connections according to claim 1, wherein the sensors are arranged in one or more of a triangle, a rectangle, a square and a circle for symmetrical force distribution, the sensors being disposed in pairs on both sides of the carrier plate.

4. The testing device for screw connections according to claim 1, wherein the sensors are piezoelectric sensors and whereby the sensors measure pressure and shear simultaneously.

5. The testing device for screw connections according to claim 4, wherein crystal elements of the piezoelectric sensors are integrated directly in the carrier plate.

6. The testing device for screw connections according to claim 1, wherein electronic amplifiers are integrated directly in the carrier plate.

7. The testing device for screw connections according to claim 6, wherein the electronic amplifiers having range switchover enabling especially interesting parts of measurements to be magnified by factors.

8. The testing device for screw connections according to claim 1, wherein the sensors are other than piezoelectric sensors.

* * * * *